United States Patent [19]
Johnson

[11] Patent Number: 6,007,608
[45] Date of Patent: Dec. 28, 1999

[54] MIST COLLECTOR AND METHOD

[75] Inventor: Bruce A. Johnson, Lake Elmo, Minn.

[73] Assignee: Donaldson Company, Inc., Minneapolis, Minn.

[21] Appl. No.: 09/113,397

[22] Filed: Jul. 10, 1998

[51] Int. Cl.$^6$ .................................................. B01D 46/24
[52] U.S. Cl. ............................... 95/287; 55/486; 55/487; 55/498; 55/527; 55/528
[58] Field of Search ............................ 55/485, 486, 487, 55/498, 491, 521, 510, 527, 528; 95/286, 287, 273

[56] References Cited

U.S. PATENT DOCUMENTS

| | | |
|---|---|---|
| 1,743,675 | 1/1930 | Jordahl . |
| 1,771,639 | 7/1930 | Jordahl . |
| 2,174,528 | 10/1939 | Prentiss . |
| 2,334,840 | 11/1943 | Punton et al. . |
| 2,413,769 | 1/1947 | Kasten . |
| 2,450,363 | 9/1948 | Slayter et al. . |
| 2,598,673 | 6/1952 | Brixius et al. . |
| 2,918,138 | 12/1959 | Lewis . |
| 2,966,960 | 1/1961 | Rochlin . |
| 3,073,735 | 1/1963 | Till et al. . |
| 3,231,639 | 1/1966 | Mabru . |
| 3,290,870 | 12/1966 | Jensen . |
| 3,298,149 | 1/1967 | Sobeck . |
| 3,384,241 | 5/1968 | Nostrand . |
| 3,386,583 | 6/1968 | Merten . |
| 3,388,202 | 6/1968 | Opferkuch, Jr. et al. . |
| 3,399,516 | 9/1968 | Hough, Jr. et al. . |
| 3,400,520 | 9/1968 | Sakurai . |
| 3,417,551 | 12/1968 | Bonell . |
| 3,417,870 | 12/1968 | Bray . |
| 3,488,928 | 1/1970 | Tarala . |
| 3,527,027 | 9/1970 | Knight et al. . |
| 3,552,553 | 1/1971 | Reading . |
| 3,672,130 | 6/1972 | Sullivan et al. . |
| 3,680,659 | 8/1972 | Kasten . |
| 3,698,161 | 10/1972 | Brixius et al. . |
| 3,727,769 | 4/1973 | Scholl . |
| 3,766,629 | 10/1973 | Lechtenberg . |
| 3,802,160 | 4/1974 | Foltz . |
| 3,822,531 | 7/1974 | Wisnewski et al. . |
| 3,837,995 | 9/1974 | Floden . |
| 3,878,014 | 4/1975 | Melead . |
| 3,918,945 | 11/1975 | Holloway . |
| 3,990,333 | 11/1976 | Davis . |
| 3,994,258 | 11/1976 | Simm . |
| 4,011,067 | 3/1977 | Carey, Jr. . |
| 4,012,211 | 3/1977 | Goetz . |
| 4,025,598 | 5/1977 | Sasshofer et al. . |
| 4,069,026 | 1/1978 | Simm et al. . |
| 4,073,850 | 2/1978 | Brackmann et al. . |

(List continued on next page.)

FOREIGN PATENT DOCUMENTS

| | | |
|---|---|---|
| 235490 | 3/1960 | Australia . |
| 0 001 407 | 4/1979 | European Pat. Off. . |
| 0 053 879 | 6/1982 | European Pat. Off. . |

(List continued on next page.)

OTHER PUBLICATIONS

"1989 SAE Handbook", SAE The Engineering Society, vol. 3, Engines, Fuels, Lubricants Emissions, & Noise, 2335–2447 (Date Unknown).

"Introducing FX–845. Scotchban™ Chemistry Takes on a New Element", 3M Protective Chemical Products Division, 12 pages (1991).

"Introducing the New Downsized Torit® Downflo® Dust Collector", Donaldson Company, Inc., 6 pages (1994).

(List continued on next page.)

*Primary Examiner*—Duane S. Smith
*Attorney, Agent, or Firm*—Merchant & Gould P.C.

[57] ABSTRACT

An improved mist collector arrangement is provided. The arrangement includes an improved pre-filter for mist collection. The pre-filter has a multi-stage construction, and includes a preferred intermediate stage of fibrous media. As a result of the improvement, preferred operation for liquid collection under various circumstances is provided.

13 Claims, 8 Drawing Sheets

U.S. PATENT DOCUMENTS

| | | |
|---|---|---|
| 4,074,985 | 2/1978 | Willas . |
| 4,086,070 | 4/1978 | Argo et al. . |
| 4,089,783 | 5/1978 | Holyoak . |
| 4,093,437 | 6/1978 | Ichihara et al. . |
| 4,099,943 | 7/1978 | Fischman et al. . |
| 4,101,423 | 7/1978 | Merrill et al. . |
| 4,102,785 | 7/1978 | Head et al. . |
| 4,104,170 | 8/1978 | Nedza . |
| 4,111,815 | 9/1978 | Walker et al. . |
| 4,143,196 | 3/1979 | Simm et al. . |
| 4,160,684 | 7/1979 | Berger, Jr. et al. . |
| 4,181,514 | 1/1980 | Lefkowitz et al. . |
| 4,188,197 | 2/1980 | Amberkar et al. . |
| 4,196,245 | 4/1980 | Kitson et al. . |
| 4,211,543 | 7/1980 | Tokar et al. . |
| 4,233,042 | 11/1980 | Tao . |
| 4,243,397 | 1/1981 | Tokar et al. . |
| 4,259,096 | 3/1981 | Nakamura et al. . |
| 4,288,503 | 9/1981 | Goldberg . |
| 4,314,832 | 2/1982 | Fox . |
| 4,322,230 | 3/1982 | Schoen et al. . |
| 4,324,574 | 4/1982 | Fagan . |
| 4,350,592 | 9/1982 | Kronsbein . |
| 4,370,289 | 1/1983 | Sorenson . |
| 4,402,830 | 9/1983 | Pall . |
| 4,436,780 | 3/1984 | Hotchkiss et al. . |
| 4,452,619 | 6/1984 | Wright et al. . |
| 4,477,270 | 10/1984 | Tauch . |
| 4,536,440 | 8/1985 | Berg . |
| 4,540,625 | 9/1985 | Sherwood . |
| 4,594,162 | 6/1986 | Berger . |
| 4,619,674 | 10/1986 | Erdmannsdörfer . |
| 4,629,483 | 12/1986 | Stanton . |
| 4,647,373 | 3/1987 | Tokar et al. . |
| 4,650,506 | 3/1987 | Barris et al. . |
| 4,676,807 | 6/1987 | Miller et al. . |
| 4,695,300 | 9/1987 | Takagi et al. . |
| 4,701,197 | 10/1987 | Thornton et al. . |
| 4,714,647 | 12/1987 | Shipp, Jr. et al. . |
| 4,720,292 | 1/1988 | Engel et al. . |
| 4,728,349 | 3/1988 | Oshitari . |
| 4,749,390 | 6/1988 | Burnett et al. . |
| 4,758,460 | 7/1988 | Spicer et al. . |
| 4,759,782 | 7/1988 | Miller et al. . |
| 4,765,812 | 8/1988 | Homonoff et al. . |
| 4,767,426 | 8/1988 | Daly et al. . |
| 4,783,271 | 11/1988 | Silverwater . |
| 4,838,903 | 6/1989 | Thomaides et al. . |
| 4,842,739 | 6/1989 | Tang . |
| 4,878,929 | 11/1989 | Tofsland et al. . |
| 4,881,957 | 11/1989 | Shofner . |
| 4,886,599 | 12/1989 | Bachmann et al. . |
| 4,976,759 | 12/1990 | Foltz . |
| 5,082,476 | 1/1992 | Kahlbaugh et al. . |
| 5,084,178 | 1/1992 | Miller et al. . |
| 5,102,436 | 4/1992 | Grabowski . |
| 5,108,474 | 4/1992 | Riedy et al. . |
| 5,122,270 | 6/1992 | Ruger et al. . |
| 5,129,923 | 7/1992 | Hunter et al. . |
| 5,154,742 | 10/1992 | Gault et al. . |
| 5,171,342 | 12/1992 | Trefz . |
| 5,238,474 | 8/1993 | Kahlbaugh et al. . |
| 5,252,207 | 10/1993 | Miller et al. . |
| 5,279,731 | 1/1994 | Cook et al. . |
| 5,283,106 | 2/1994 | Seiler et al. . |
| 5,290,330 | 3/1994 | Tepper et al. . |
| 5,306,321 | 4/1994 | Osendorf . |
| 5,350,443 | 9/1994 | von Blücher et al. . |
| 5,350,513 | 9/1994 | Markowitz . |
| 5,364,456 | 11/1994 | Kahlbaugh et al. . |
| 5,415,676 | 5/1995 | Tokar et al. ............................... 55/486 |
| 5,423,892 | 6/1995 | Kahlbaugh et al. . |
| 5,454,858 | 10/1995 | Tokar et al. ............................... 55/498 |
| 5,468,382 | 11/1995 | Cook et al. . |
| 5,476,585 | 12/1995 | Mills . |
| 5,605,748 | 2/1997 | Kennedy et al. ......................... 55/486 |
| 5,622,537 | 4/1997 | Kahlbaugh et al. . |
| 5,660,607 | 8/1997 | Jokschas et al. .......................... 55/498 |
| 5,669,949 | 9/1997 | Dudrey et al. ............................ 55/487 |
| 5,795,369 | 8/1998 | Taub ......................................... 55/498 |
| 5,858,044 | 1/1999 | Nepsund et al. ......................... 55/486 |

FOREIGN PATENT DOCUMENTS

| | | |
|---|---|---|
| 0 083 789 | 7/1983 | European Pat. Off. . |
| 0 181 716 | 5/1986 | European Pat. Off. . |
| 0 208 515 | 1/1987 | European Pat. Off. . |
| 0 212 082 | 3/1987 | European Pat. Off. . |
| 0 347 188 | 12/1989 | European Pat. Off. . |
| 2.214.505 | 8/1974 | France . |
| 3 513 062 | 10/1986 | Germany . |
| 630 886 | 12/1961 | Italy . |
| 900 450 | 7/1962 | United Kingdom . |
| 909 894 | 11/1962 | United Kingdom . |
| 1 401 231 | 7/1975 | United Kingdom . |
| 1 460 925 | 1/1977 | United Kingdom . |
| 2 084 897 | 4/1982 | United Kingdom . |
| 2 101 902 | 1/1983 | United Kingdom . |
| 2 152 399 | 8/1985 | United Kingdom . |
| 2 197 802 | 6/1988 | United Kingdom . |
| WO 79/00978 | 11/1979 | WIPO . |
| WO 84/03450 | 9/1984 | WIPO . |
| WO 89/07484 | 8/1989 | WIPO . |
| WO 92/06767 | 4/1992 | WIPO . |

OTHER PUBLICATIONS

"Method of Testing Air–Cleaning Devices Used in General Venilation For Removing Particulate Matter", The American Society of Heating, Refrigerating and Air–Conditioning Engineers, Inc., 2 pages (1976).

"Standard Test Method for Determining the Initial Efficiency of a Flatsheet Filter Medium in an Airflow Using Latex Spheres", American Society for Testing and Materials, pp. 1–9 (Date Unknown).

Elfstrand, J., "Performance Evaluation for TPIS 100–007 Vs AC A1097C", 4 pages (Dec. 8, 1995).

Jaroszczyk, T., "Experimental Study of Nonwoven Filter Performance Using Second Filter Orthogonal Design", Corpate Research Department, Nelson Industries, Inc., *Particulate Science and Technology*, Copyright 1987 by Hemisphere Publishing Corp.

Material Safety Data Sheet, U.S. Department of Labor, Occupational Safety and Health Administration, 2 pages.

Rodman, C.A. et al., "Nonwovens in Filtration/Separation", Nonwoven Fabrics Forum, Jun. 21–23, 1988, Clemson University, Clemson, SC, pp. 1–12.

Schwarz, E., "New Concepts in Process Design for Micro–Fibers by Melt–Blowing", TAPPI Seminar Notes, pp. 17–25.

… … …

MIST COLLECTOR AND METHOD

FIELD OF THE INVENTION

The present application relates to mist collector systems. The present mist collector invention relates to a filter media arrangement for preferred collection of airborne liquids. The preferred media wrap of the present disclosure is useable with such systems as those described in U.S. Pat. No. 5,454,858 (the '858 patent), the complete disclosure of which is incorporated herein by reference.

BACKGROUND OF THE INVENTION

The metal working industry utilizes various coolants and lubricants during cutting and forming operations. These liquids include pure oils, oil and water mixtures, and non-oil synthetics. Because of the forces with which these fluids are applied during metal working operations and the heat generated when the cutting tool meets the workpiece, a fine mist or aerosol (air borne) is often generated. To arrest this mist, a filter system is required.

If the machine tool is free standing, the aerosol mist can be pulled away from the area using a hood over the cutting area. Alternatively, newer machine tools employ enclosures around the cutting area, which allow the mist to be withdrawn from a single location.

Certain improvements in mist collector constructions and cartridges are described in U.S. Pat. Nos.: 5,454,858; 5,415,676; and 5,611,922; the disclosures of each of these three patents being incorporated herein by reference. Each of these patents is owned by Donaldson Company, Inc. of Minneapolis, Minn., the assignee of the present application. The Donaldson line of mist collectors, implementing such technology, is available under the registered trademarks Torit® and Dryflo®, from the Torit division of Donaldson Company.

SUMMARY OF THE INVENTION

According to certain aspects of the present invention, an improved pre-filter wrap for use with the mist collection filter system is provided. The improved pre-filter wrap preferably includes three stages of material, for a preferred operation. The intermediate stage is preferably one having an average pore size of no greater than 370 microns, permeability within the range of 180–350 ft/min., and a thickness of no greater than 0.04 inches. Preferably the stages upstream and downstream from the preferred intermediate region are both fibrous depth media, with preferred constructions being as indicated.

Also according to certain aspects of the present invention, a preferred combination is provided which comprises: a pre-filter wrap, preferably as described, positioned in operational relationship with respect to a filter cartridge, for example a pleated cartridge, typically with the pre-filter circumscribing the cartridge. Such a combination provides for a preferred pre-filter wrap/cartridge combination for use in filtering airborne mist from such operations as metal cutting or drilling operations.

According to the present invention preferred mist collectors are provided, which include the preferred pre-filter wrap/cartridge combinations described above. Also preferred methods of operation and use are provided.

BRIEF DESCRIPTION OF THE DRAWINGS

in FIG. 8 the wrap being depicted with a portion broken away to view internal detail and with a closure partly open;

DETAILED DESCRIPTION OF THE PREFERRED EMBODIMENT

A. The Mist Collector System of U.S. Pat. No. 5,454,858

Figure 1:
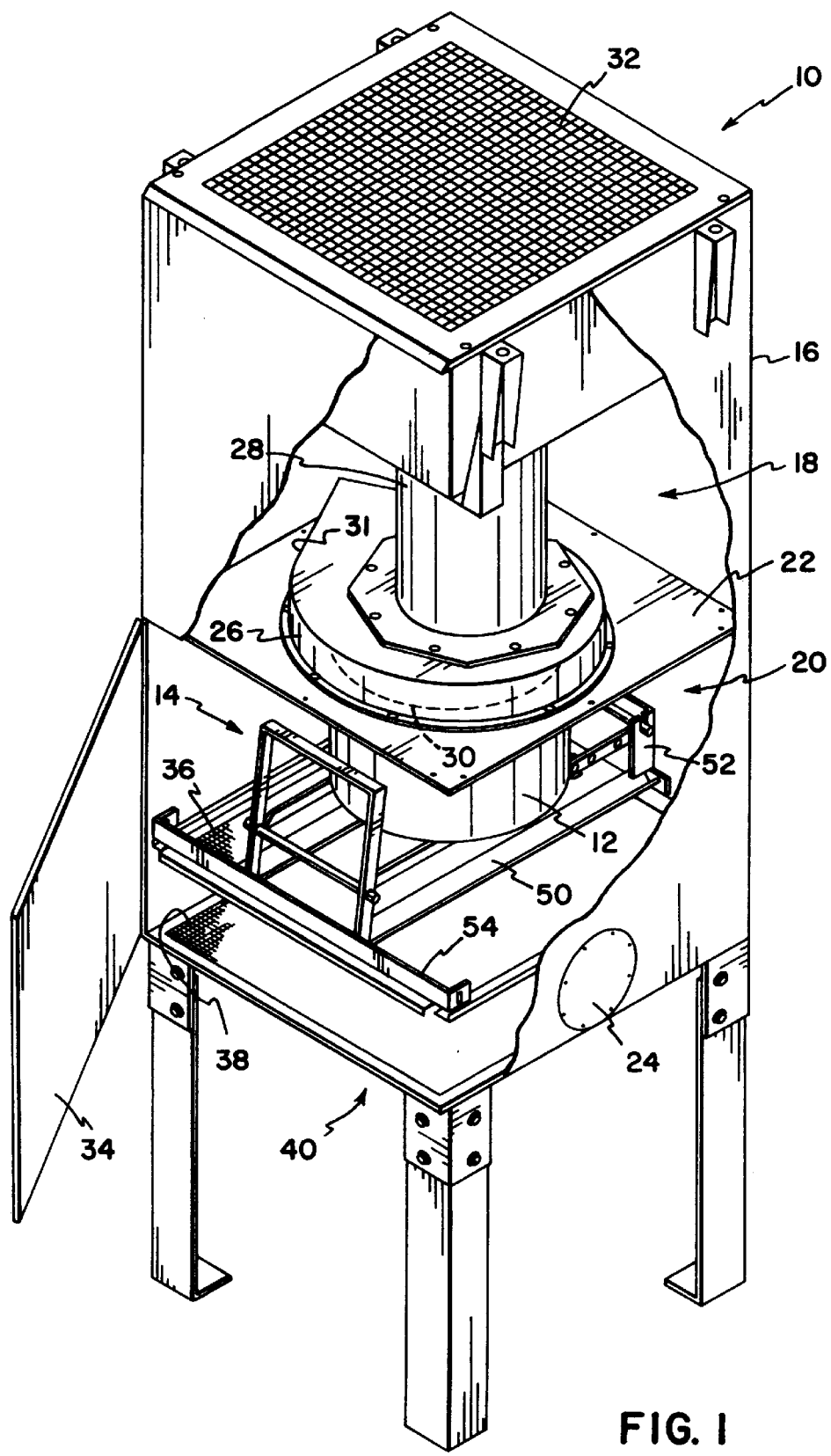
FIG. 1 illustrates a perspective view of a prior art mist collection system as described in U.S. Pat. No. 5,454,858.

FIG. 1 illustrates a mist collection system 10 for use with the preferred mist collector cartridge 12. It will be understood that the improved preferred filter wrap 221 described hereinbelow, in Section D, may be used with any suitable filtration system and cartridge and its application is not limited to the illustrated prior art mist collection system 10 and cartridge 12 depicted.

The mist collection system 10 comprises a housing 16 with an upper chamber 18 and lower chamber 20 separated by a dividing wall 22 having an exhaust port opening 30. The upper chamber 18 contains a blower housing 26 and a motor 28 in fluid communication with the mist collector cartridge 12 by way of the exhaust port 30.

A fan in the blower housing 26 draws contaminated air into the lower chamber 20 through an air inlet port 24. The contaminated air is drawn through the sidewalls of the mist collector cartridge 12 and is expelled through a blower opening 31 into the upper chamber 28. As pressure in the upper chamber 18 increases, the filtered air is forced through an outlet port 32 in the top of the mist collection system 10. A high efficiency particulate air (HEPA) filter may be installed proximate the outlet port 32 in the upper chamber 18 as a final stage filter.

A door 34 is provided on the front of the lower chamber 20 through which the mist collector cartridge 12 can be inserted or removed. An upper screen 36 and lower screen 38 are preferably located in the lower chamber 20 of the mist collection system 10 above and below the air inlet port 24, respectively. The upper and lower screens 36, 38 prevent particulates, such as metal shavings, from being drawn into the mist collection cartridge 12 or from falling into a hopper 40 at the bottom of the mist collection system 10.

The mist collector cartridge 12 is retained in the lower chamber 20 of the mist collection system 10 by the filter retention mechanism 14. The preferred filter cartridge retention system 14 depicted contains a pair of V-shaped angled slides 50 which extend from a rear pivot bracket 52 mounted on the rear of the mist collection system 10 to a front bracket 54 attached to the mist collection system 10 proximate the door 34.

Figure 2:
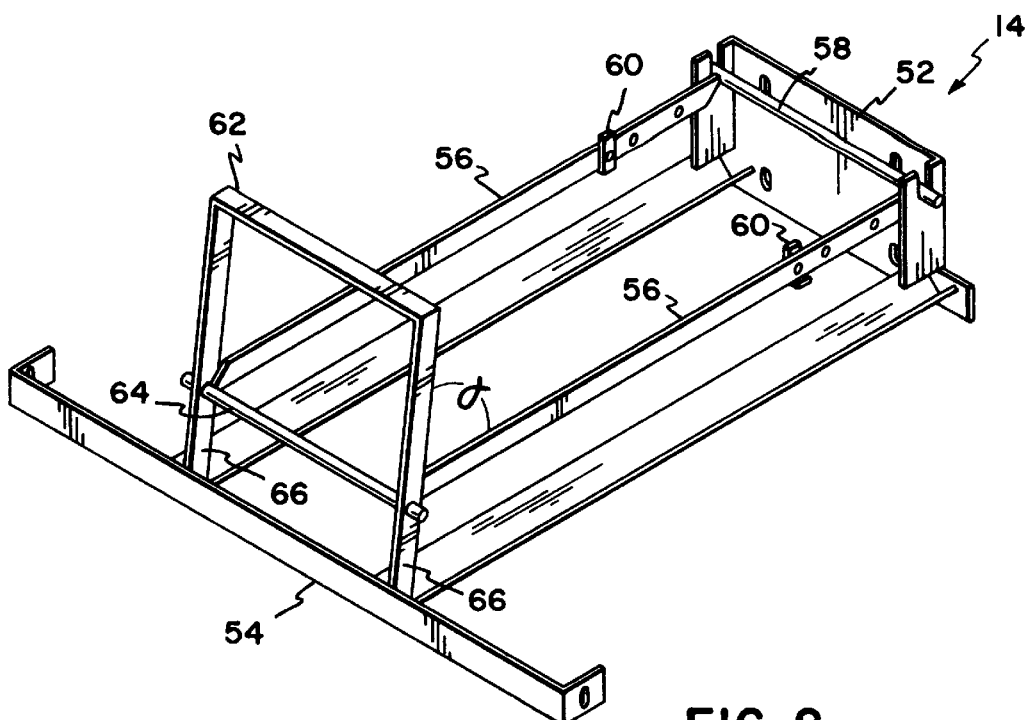
FIG. 2 is a perspective view of a filter cartridge retention mechanism for the prior art arrangement of FIG. 1, depicted in an operational position.

FIG. 2 illustrates the filter cartridge retention system 14 locked in the operational position. A pair of support members 56 is pivotally attached to the rear pivot bracket 52 by a rear pivot rod 58. A pair of filter cartridge end stops 60 is attached to the support members 56 so that the mist collector cartridge 12 is correctly positioned within the filtration system 10 in fluid engagement with the exhaust port 30 in the dividing wall 22 (See FIG. 1). An elongated handle 62 is pivotally attached to the free ends of the support members 56 by a front pivot rod 64. The handle 62 preferably has a pair of feet 66 which simultaneously rest in the angle slides 50 and which are wedged against the front bracket 54. The length of the support members 56 is determined so that the angle α of the handle 62 with respect to the support members 56 is less than 90°. Consequently, the filter cartridge retention system 14 is capable of exerting significant upward force on the filter cartridge 12 without a significant danger of disengagement. The feet 66 of the handle 62 are beveled (See FIG. 3) on the base of the handle 62 to facilitate sliding in the angled slides 50. In the operational position, the beveled surfaces of the feet 66 rest securely against the back surface of the front bracket 54.

Figure 3:
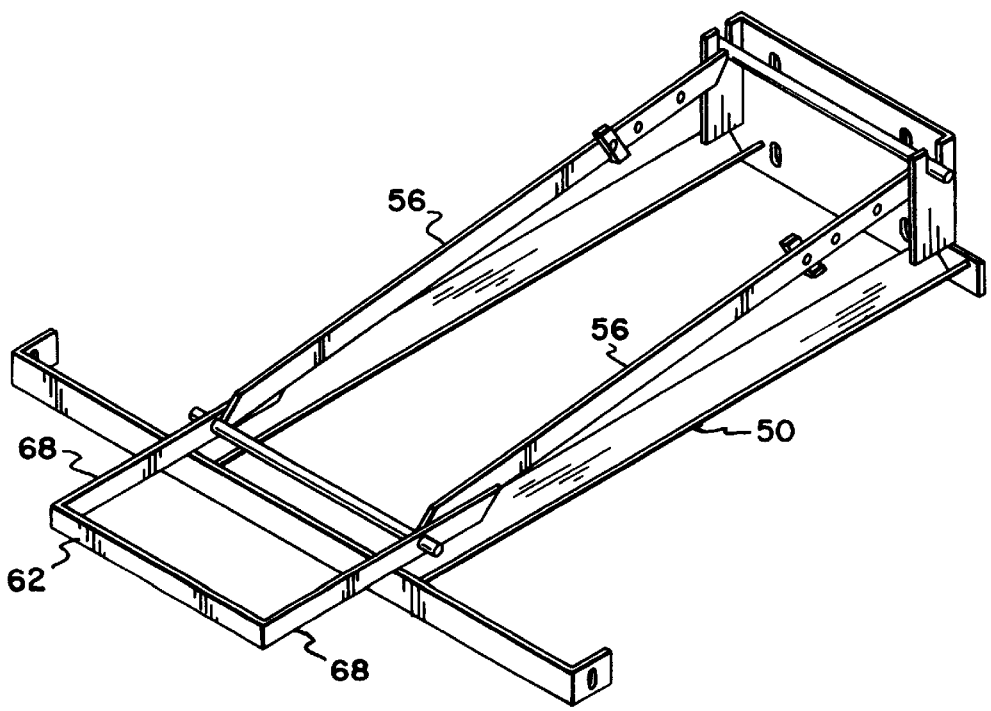
FIG. 3 is a perspective view of the prior art filter cartridge retention mechanism of FIG. 2 shown in a reclined and released position.

FIG. 3 illustrates the filter cartridge retention system 14 in a reclined or released position. The feet of the handle 66 ride in the V-shaped angled slides 50 as the handle 62 is moved forward away from the mist collector cartridge 12. When the handle 66 is in the horizontal position, the support members 56 are angled downward toward the door 34 to allow easy insertion or removal of a mist collector cartridge 12. The handle 62 operates as an extension 68 of the support members 56 to facilitate insertion and removal of a mist collector cartridge 12. When the handle is in the horizontal position, it extends out from the doorway, preventing the door 34 from being closed unless the filter cartridge retention system 14 is in the operational position.

It will be understood that the components of the filter cartridge retention system 14 can be changed or modified from those depicted. For example, the support members 56 may be replaced by a single rigid pivot member. Likewise, the handle may be configured as a solid member pivotally attached to a support members.

Figure 4:
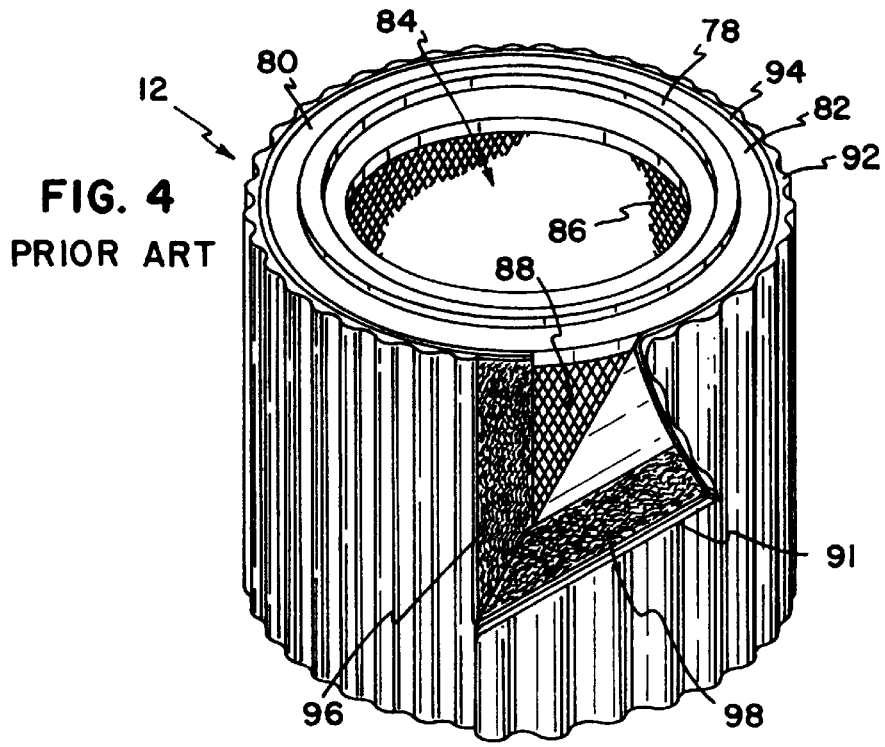
FIG. 4 is a perspective view of the prior art mist collector of U.S. Pat. No. 5,454,858 cartridge with a multiple layer pre-filter wrap.
Figure 5:
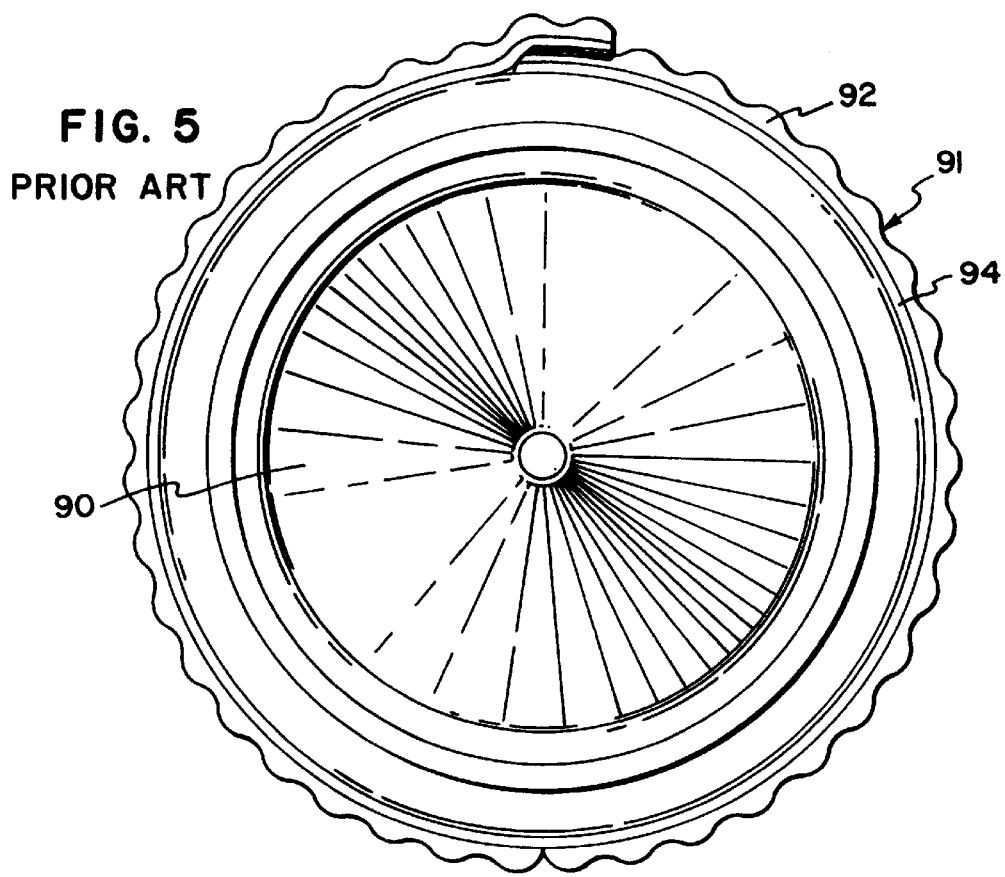
FIG. 5 is a top view of the mist collector cartridge of FIG. 4.

FIG. 4 illustrates a prior art the mist collector cartridge 12. Filter support members 80 preferably include a circular top member or top end cap 82 having a top opening 84, perforated inner and outer filter sidewalls or liners 86, 88 and a bottom end cap 90 (See FIG. 5). The top end cap 82 contains a compression gasket 78 to ensure fluid tight engagement with the exhaust port 30. The support members 80 could be constructed of any suitable material, including metal or plastic. Such a cartridge can be used with the improved pre-filter wrap described in Section D below.

B. The Pre-Filter Wrap of U.S. Pat. No. 5,454,858

As shown in FIG. 4, the perforated outer filter sidewall 88 of U.S. Pat. No. 5,454,858 is covered with a pre-filter wrap 91. The pre-filter wrap illustrated in FIGS. 4 and 5 comprises a corrugated outer wrap 92 and a generally flat inner wrap 94. The inner and outer pre-filter wraps 92, 94 may be joined by a seam along hook and loop portions 96, 98. Such hook and loop fasteners 96, 98 are available under the trade name VELCRO®. The pre-filter wrap 91 is attached to the filter support members 80 by use of the hook and loop fastener material 96, 98 on the edges of the pre-filter wrap 91 (See FIG. 5).

The pre-filter wrap 91 was characterized in U.S. Pat. No. 5,454,858 as possibly being constructed of a foamed urethane material, also referred to as a fully open cellular filtration foam. A foam material suitable for this purpose was characterized as available under the trade name Filter Foam from Scott Foam Inc., Chester, Pa. In the '858 patent, the outer wrap 92 was described as preferably more porous than the inner wrap 94, allowing it to hold a greater quantity of liquid. The outer wrap 92 was described as preferably 0.75" thick, with approximately 45 pores/inch., and the inner wrap 94 as preferably 0.25" thick with approximately 100 pores/inch. In operation, the foamed urethane wrap 91 was described as holding liquid, but preferably as not building resistance to air flow.

C. A Preferred Cartridge and Pre-Filter Wrap of U.S. Pat. No. 5,454,858

Figure 6:
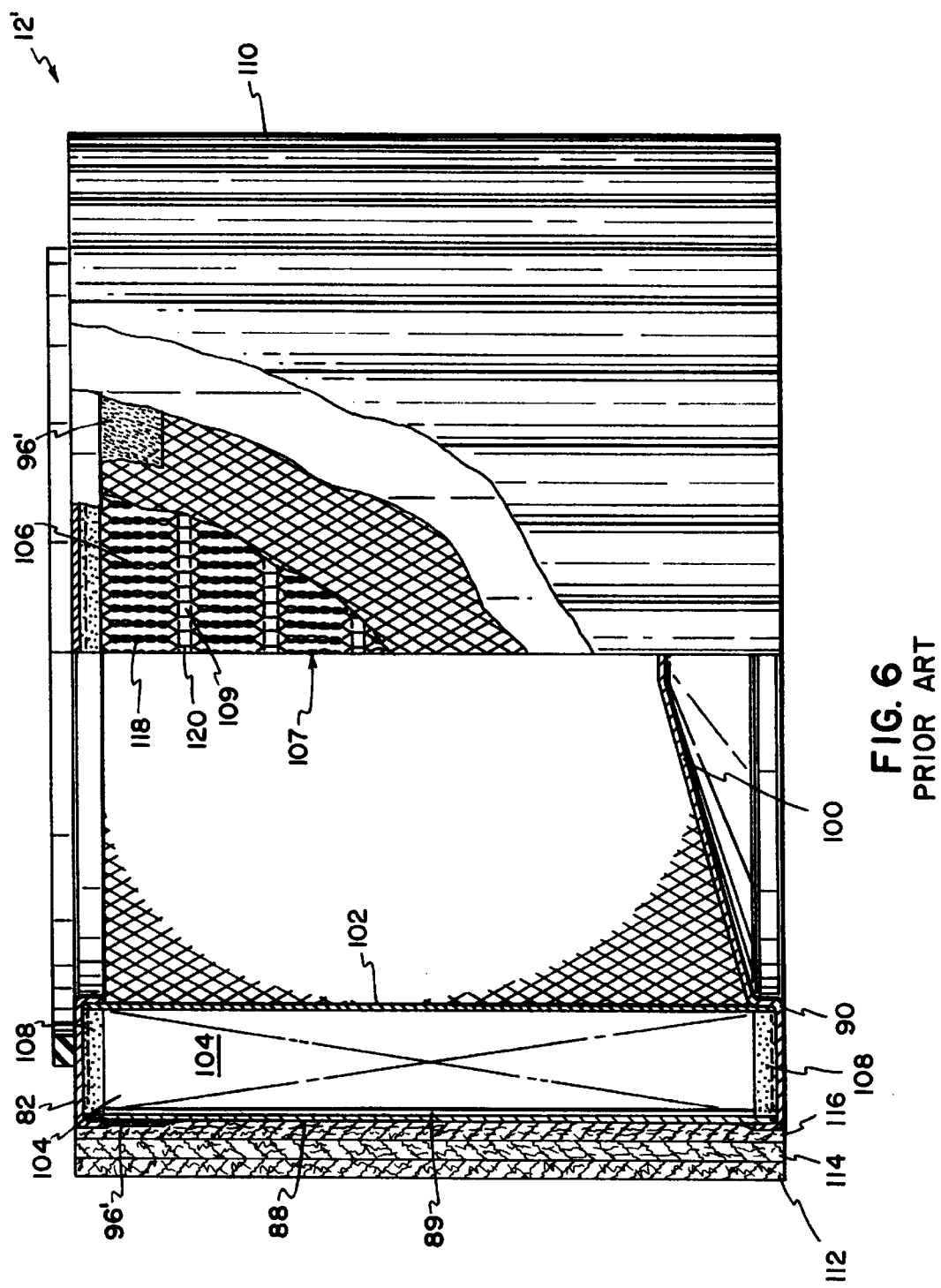
FIG. 6 is a sectional view of a prior art mist collector cartridge according to U.S. Pat. No. 5,454,858 using multiple layers of non-woven air laid material as a pre-filter wrap.

FIG. 6 illustrates a sectional view of another mist collector cartridge 12' of U.S. Pat. No. 5,454,858. The bottom end cap 90 has a sloped portion 100 which allows oil that is collected on the inner surface 102 of cartridge 12' to drain through filter media 104 and into the hopper 40.

The filter media 104 was described as preferably comprising a synthetic glass and polyester material arranged to form a cylindrical pleated filter cartridge. (A pleated construction being one which, in cross-section, has a plurality of alternating peaks and valleys.) The filter media 104 was described as preferably having a high efficiency, between 70 and 90 percent at 0.778 micron particles.

To keep pleats 107 correctly spaced, the filter media 104 was described as scored to create alternating rectilinear line portions 118 and curvilinear line portions 120. During the corrugation process, dimples 109 were described as integrally formed in the filter media 104 along the pleat tips 106 to maintain the spacing between the pleats 107. Construction of a corrugated filter media of this type was disclosed in U.S. Pat. No. 4,452,619, issued to Wright et al. on Jun. 5, 1984, which is hereby incorporated by reference into this specification.

According to the '858 patent, as dirt and oil accumulate on the filter media 104, the media 104 becomes partially clogged so that the air flowing through the filter media 104 accelerates to create additional pressure on the filter media 104. In order for the filter media 104 to withstand the increased pressure, the pleats 107 were described as preferably spaced more closely together than on an air filter, giving the filter media 104 additional structural integrity. According to the '858 patent, because pleats on an ordinary air filter are generally spaced further apart, they would probably collapse under the air pressure in the present mist collection system.

The filter media 104 was described as preferably a low surface energy synthetic fiber matrix constructed from fibers having a thickness of less than 0.030". The filter media 104 may be treated (in part or in total) with a low surface energy material, such as an aliphatic fluorocarbon. One low energy coating suitable for this purpose is sold under the trade name Scotchguard ® or Scotchban ® Protector, by 3M Corporation, St. Paul, Minn. Scotchban ® Protector is described in brochure entitled *Introducing FX-845 Scotchban Chemistry Takes On A New Life*, dated 1991, which is hereby incorporated by reference into this specification.

Low surface energy coatings and low surface energy materials create a low surface energy on the filter media 104 which facilitates agglomeration of the oil and promotes drainage. The pre-filter wraps 91, 110 may also be treated (in part or in whole) with a low surface energy material.

As is illustrated in FIG. 6, the filter media 104 of U.S. Pat. No. 5,454,858 was recessed or set back from the inside surface of the outer liner 88 so that a space 89 was formed between the outer liner 88 and the filter media 104. The space 89 allows much of the oil that penetrates the pre-filter wrap 91 to form droplets on the inside surface of the pre-filter wrap 91 or the outer liner 88, rather than on the filter media 104.

According to U.S. Pat. No. 5,454,858, the pleats 106 are arranged vertically in the cartridges 12, 12'. The filter media 104, and inner and outer liners 86, 88 are retained in the top and bottom end caps 82, 90 by a filter media adhesive 108, such as plastisol. The hook portion 96' of a fastener material may be retained between the outer liner 88 and the top end cap 82 around the perimeter of the mist collector cartridge 12' by the adhesive 108. The pre-filter wrap 91 may then be attached directly to the mist collector cartridge 12, 12'.

Oil mist too fine to collect on the outside surface of the filter media 104 may emerge on the inner surface 102 of the pleats 106. The vertical pleats 106 allow liquid collected on the inner surface 102 to drain downward onto the bottom end cap 90 of the cartridges 12, 12', where it passes through the filter media 104 and into the hopper 40.

Figure 7:
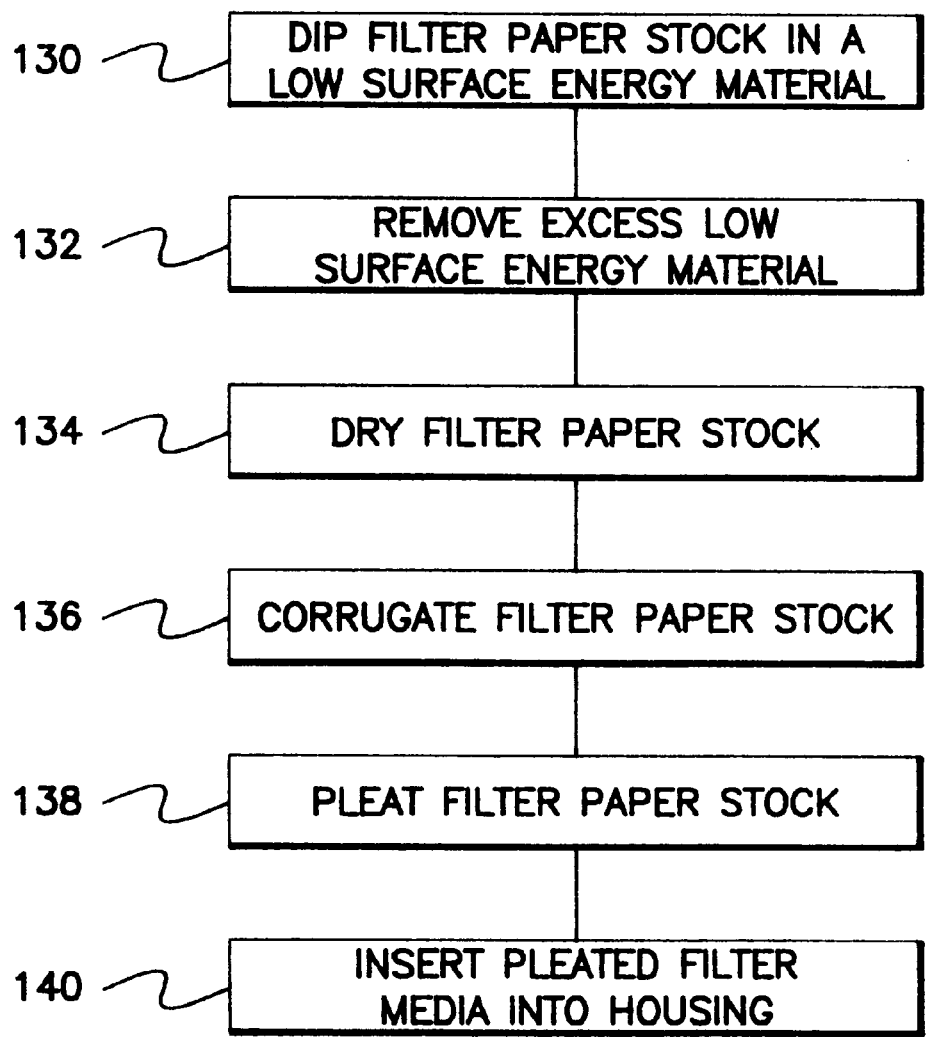
FIG. 7 is a flow chart illustrating a method of manufacturing a prior art mist collector cartridge according to U.S. Pat. No. 5,454,858.

The filter media 104 was described in U.S. Pat. No. 5,454,858 as preferably constructed according to the flow chart illustrated in FIG. 7. The flat filter paper stock was preferably dipped in a low surface energy coating material 130, such as an aliphatic fluorocarbon. It should be understood that the paper stock may be treated or wetted by a variety of methods, including spraying. The excess coating material was described as removed by compressing the coated paper stock between a pair of compression rollers 132. The coated paper stock was described as then dried in a convection drying oven 134. It was noted that the coating may be applied to a portion of the surface of the paper stock, rather than to all of it, with some beneficial effects still obtained.

According to U.S. Pat. No. 5,454,858, prior to pleating, the paper stock is corrugated 136 (to provide, in cross-section, alternating peaks and valleys) by pressing a series of grooves lengthwise along the paper with a heated roller. The paper stock was described as then pleated 138 to form the filter media 104 and was then inserted into a filter housing 140. According to U.S. Pat. No. 5,454,858, the preferred corrugation process was disclosed in U.S. Pat. No. 4,452,619 issued to Wright et al., previously incorporated by reference into this specification. It will be understood that the cylindrical filter cartridge illustrated herein is set forth by way of example only and that a variety of filter configurations are possible. For example, generally planar filter cartridges having suitable drainage mechanism may be used in place of the cylindrical cartridge.

FIG. 6 also illustrates a pre-filter wrap 110. According to the '858 patent, the pre-filter wrap 110 was preferably constructed of multiple layers of non-woven air-laid media, such as high loft air-laid or dry-laid materials. Because of the nature of the pre-filter wrap 110, it may be attached directly to the hook portion 96' without the use of mating hook-portion.

In a preferred embodiment described in U.S. Pat. No. 5,454,858, the outer pre-filter layer 112 is approximately 0.75" of open material having a density of 6.7 ounces/sq. yd. and solidity of 0.8%. A product meeting these specifications was characterized as sold under the trade name Airlaid Media by Cumulus Fiber Corp. located in Charlotte, N.C. The two inner layers 114, 116 were characterized as approximately 0.25" of a high efficiency material having a density of 3.62 ounces/sq. yd and a solidity of 1.6%. A product meeting this specification was characterized in '858 as available from Kem-Wove (or Chemwove) Corp. in Charlotte, N.C.

The preferred pre-filter wrap 110 was described in '858 as accumulating oil during operation of the mist collection system 10. As oil accumulates, the pressure drop across the filters 12, 12' increases. When the motor 28 in the blower housing 26 is turned-off, the oil accumulated in the pre-filter wrap 110 drains downward into the hopper 40. After the oil has drained, the pressure drop across the filters 12, 12' is reduced.

In an alternate embodiment described in U.S. Pat. No. 5,454,858, the pre-filter wrap may be constructed of fiber-glass or fiberglass wool filter media of various thicknesses and efficiencies, characterized as sold under the trade name Fiberglass Wool, by Schuller Filtration Corp. located in Vienna, W. Va. Fiberglass materials hold oil with increases in the pressure drop across the filter as oil accumulates. By replacing the fiberglass pre-filter wrap periodically, the life of the filter media 104 would be extended.

According to U.S. Pat. No. 5,454,858, due to the low surface energy of the filter media 104, the media 104 retains less oil. It was described in U.S. '858 that in actual operation, oil droplets formed on the outside surface of the filter media 104 drain downward by gravity into the collection hopper 40 and, that oil that passes through the media 104 and agglomerates on the inside surface 102 drains by gravity to the sloped portion of the bottom end cap 90 and passes back through the filter media 104 into the hopper 40. According to U.S. Pat. No. 5,454,858, the agglomeration of the oil on the inside and outside surfaces of the media 104, in combination with the vertically oriented pleats 106, helps ensure that relatively little oil is bled into the downstream air. Thus, according to U.S. Pat. No. 5,454,858 the filter media 104 does not absorb the oil, but instead separates it and drains it off so that it can be collected and disposed of apart from the filter 12. In some applications, the collected fluid is recycled.

Further, according to U.S. Pat. No. 5,454,858, because the filter media 104 is pleated, it has a large surface area which allows air flowing through the media 104 to move at a low velocity, reducing the tendency of oil to be blown off the inner surface 102 of the filter 12 into the downstream air.

In the preferred embodiment described in the '858 patent, the efficiency and pressure drop across the cartridges 12, 12' increases over time. However, the mist collector cartridges 12, 12' were characterized as functioning for a relatively long period of time because, it was asserted, the media 104 does not rapidly become saturated with oil (by comparison to previous systems). As the filters 12, 12' become clogged with dirt and other particulates, the efficiency and the pressure drop across the filters 12, 12' increases. Therefore, the pressure drop across the filter 12, 12' corresponds to the amount of useful life remaining in the filters 12, 12', which can be used to indicate when the filters 12, 12' need to be replaced.

D. Preferred Pre-Wraps for Mist Collection

According to the present invention, alternate pre-wraps for mist collection, for example for use with arrangements described above and in U.S. Pat. No. 5,454,858, are provided. The technology generally relates to achievement, in some instances, in improved operation and performance by provision of an alternate, preferred, pre-filter wrap.

The technology described developed, in part, from observations made with respect to commercial exploitation of the technology described in U.S. Pat. No. 5,454,858. In eventual commercial exploitation, certain filter wraps used and sold under the trademark Dryflo®, were constructed as follows:

1. Outerwrap—1 layer of 4.0–4.8 oz/yd$^2$ (105–129 g/m$^2$) polyester fiber depth media (mixed fibers); 0.55–0.70" (14–18 mm) thickness freestate (as measured under 0.002 psi compression); average fiber diameter about 21.0 micron (mass weighted average) or about 16.3 micron (length weighted average); permeability (minimum) 500 ft/min (152 m/min.); free state solidity about 0.6–1.0%, typically about 0.7%.
2. Next inner region—2 layers of 3.1–3.8 oz/yd$^2$ (105–129 g/m$^2$) polyester fiber depth media; 0.32–0.42 inch thick (8.1–10.7 mm.) freestate (under 0.002 psi compression); average fiber diameter 12.5 micron (by either mass weight or length weight); permeability (min.) 370 ft/min.; free state solidity 0.8–1.4% typically about 0.9%.

Herein, when reference is made to permeability, the numerical references are to the media face velocity (air) required to induce a 0.50 inch H$_2$O restriction across a flat sheet of the referenced material (or media. In general, permeability is assessed by the Frazier Perm Test according to ASTM D737, using a Frazier Perm Tester available from Frazier Precision Instrument Co., Inc., Gaithersburg, Md., or by some analogous test.

In certain applications, the field life of the cartridges (downstream from the pre-wrap) was observed to be about three to six weeks and some bleed through the elements was observed. The relatively short life and bleed through appeared to be of most concern with respect to 100% oil applications; that is, applications in which the mist to be collected was about 100% oil, as opposed to a water soluble cutting fluids (80–90% water).

While investigating this phenomenon in connection with development of the improvement according to the present invention, it was observed that many of the oils used in those industry applications that generate a 100% oil air borne mist or aerosols (that need to be collected) include so called anti-mist chemical additives. These additives make it less likely that the industrial process will generate oil particles less than 5 microns, thus shifting the size distribution curve to the "right" (or higher) creating higher average diameter oil particles in the airborne mist to be collected. More specifically, in general for 100% oil applications in which the oil does not include anti-mist additives, an average oil droplet size within the range of about 4–10 microns, is typical, with the majority by weight also being within this range, but with some presence of both smaller and larger oil particles. On the other hand, when anti-mist additives are provided in the oil, larger average oil sizes, for example on the order of about 8–22 microns (average) are observed. Of course, in part the particle size is a function of the spray velocity and volume of the liquid into the industrial process.

Based upon observations made with respect to the performance of the commercial Dryflo® pre-filter wraps in 100% oil systems, efforts were made to develop an improved pre-filter wrap with the following goals:

1. A capability to filter significant fluid flow rates; i.e. a load of liquid of at least 50 mg/m$^3$, with many typical operations being about 50–400 mg/m$^3$. Herein liquid flow rates on the order of about 75 mg/m$^3$ or above, especially 150 mg/m$^3$ or above, will sometimes be referred to as "heavy" load rates. (Herein with respect to load flow volume or velocity the term "mg/m$^3$" is meant to refer to wt. of airborne liquid per unit volume of air passing through the pre-filter wrap.) Of course the material should be one which will work with lower flow rates, i.e. below 50 mg/m$^3$; however higher rates, at least 75 mg/m$^3$, and typically 80 mg/m$^3$, usually present greater potential for problem, especially with previous systems.
2. Provide for operation with a reduced level of terminal plugging (relatively long term operation with a 2–4 inch pressure drop across the filter system preferred); and
3. Reduction in visible emissions.

During the studies, it was concluded that many of the problems with 100% oil applications would be exacerbated under heavy loading conditions, for example, 75 mg/m$^3$ load or higher, in which the oil was observed to penetrate the prior art Dryflo® pre-filter wrap and to saturate the pleated media in the downstream cartridge. It was observed that the oil would then partially discharge into the HEPA filter, causing some plugging and visible emissions. An objective was to increase the efficiency of the pre-filter wrap so that it would take a larger percentage of the liquid loading, in order to reduce the loading of the oil to the pleated media and eventually to the HEPA. A focus was to establish steady state coalescence with continuous draining during operation. The term "steady state coalescence" in this context, is meant to refer to a rate of coalescence and draining of oil from the pre-filter wrap such that a pressure drop across the total filter of 4.5 inches or less, typically 4 inches of H$_2$O or less, is maintained during extended continuous operation periods (periods of at least 6 weeks, typically at least 4 months, usually at least 4–6 months (120–180 days)). Alternately stated, a pressure increase would occur until a steady state operation was obtained, at which point collected oil would drain from the system at approximately the same rate it would load and ΔP would level off, with a relatively slow, if any, rate of pressure increase.

Herein when reference is made to a pressure drop across the filter, or ΔP, unless otherwise stated, the reference is to the measurement of pressure drop across the entire filter cartridge assembly comprising both a pre-filter and the pleated cartridge. In general, pleated cartridges the type used with pre-filters characterized herein provide, when fresh or not loaded, for a pressure differential of about 0.6 inches H$_2$O, with the remainder of the initial pressure drop resulting from the pre-filter wrap. Herein, the term "steady state operation" is not meant to suggest no increase in pressure drop occurs, but rather that the pressure drop which occurs is relatively slow and allows for operation on a continuous basis for at least a period as stated, under the conditions stated, without pressure increase substantially above the 4 inch H$_2$O ΔP limit (or other limit) characterized (i.e. sufficiently above the limit that operation is compromised). It is noted that in typical systems a face velocity during operation is at least 80 ft/min., typically at least 100 ft/min. is common. Often operations are within the range of about 80–140 ft./min., more typically 100–120 ft./min. In general, the pre-filters would be designed or sized for this face velocity, with the power of the blower accordingly chosen.

In general, during many typical industrial process, the weight of liquid carried in the air to be filtered will be on the order of at least 50 mg/m$^3$, in many instances 75 mg/m$^3$ or more. Indeed, rates of 50–400 mg/m$^3$ are expected for many systems. Preferably the operation is such that no matter where in this range operation is conducted, a steady state operation is achieved even during continuous operation for the period stated. (Of course lower load rates are sometimes observed, but they often present less problem with respect to plugging.)

As a result of the investigations, a preferred three stage, four layer, pre-filter wrap was developed. The construction of the preferred three stage, four layer, wrap, from outside to inside (or upstream to downstream) is as follows:

1. Relatively high loft, relatively high perm, relatively low solidity fibrous depth media.
2. Fibrous depth media of lower loft and higher solidity than region 1.
3. Fibrous media of relatively low average pore size, relatively high percent solidity and low permeability, by comparison to either of regions 1 and 2.
4. Region of higher loft, higher permeability, lower solidity, fibrous depth media than region 3. Preferably regions 2 and 4 are of the same material or similar materials.

The improved construction characterized generally differs from the previous commercial pre-filter arrangements sold under the designation Dryflo® (and described above) as a result of the introduction into the filter wrap of the material characterized as region or layer 3, i.e. through introduction of fibrous media of relatively low average pore size, relatively high % solidity and low permeability (by comparison to other regions in the wrap). This portion is characterized below, as Stage II. Advantage results not only from the incorporation of this material, but from the incorporation where indicated, i.e. as an intermediate layer.

In general, improvement is believed to result from the following effects. The media selected for region 3 has a fairly open pore structure (permeability at least 180 fpm, typically less than 340 fpm, preferably within the range of 200–320 fpm, more preferably 240–280 fpm, typically and most preferably about 260 fpm) which, although substantially lower than the other regions, does allow the oil to collect, but also allows the oil to drain through as the media in this region becomes fully saturated. Were a substantially lower permeability media chosen for this location, the retained oil would tend to plug the system. If a substantially higher permeability were chosen, the oil mist would tend to blow through into the next layer, with eventual bleed to the cartridge (pleated) media. The preferred media in this region will have a relatively low average pore size, typically less than 400 microns, usually within the range of 180–320 microns which facilitates mist coalescence without excessive pressure build-up.

The preferred media in region 3 typically has a fairly low efficiency and low pressure drop when clean, but obtains relatively high efficiency when fully oil saturated, i.e. loaded such that a pressure differential across the total filter in use is at about 3.5–4.5 inches $H_2O$ ΔP (typically about 4 inches of $H_2O$ or lower). Under conditions of relatively heavy mist load, i.e. 75 mg/m³ or higher, the pre-filter will load up to about 3.5–4 inch $H_2O$ ΔP within several days of continuous use, and then the system will generally stabilize with steady state operation and draining for at least 6 weeks of continuous operation, typically for at least 120 days and often up to 180 or more of steady, continuous, operation. Air velocity through the media wrap (typically 100–120 fpm face velocity in normal commercial systems) pushes the collected oil to the backside of the this layer (layer 3 above), where it will drain into the downstream layer next to it (layer 4 above). This coalesced oil will then drain down the outside of the cartridge before it reaches the pleated media section.

It is noted that if the air flow is turned off for a period of eight hours, most of the coalesced oil will drain and the pressure will drop to around 2 inches $H_2O$ ΔP (when the system is next turned on). Thus, switching the system off can result in some draining and self-cleaning.

Figure 8:
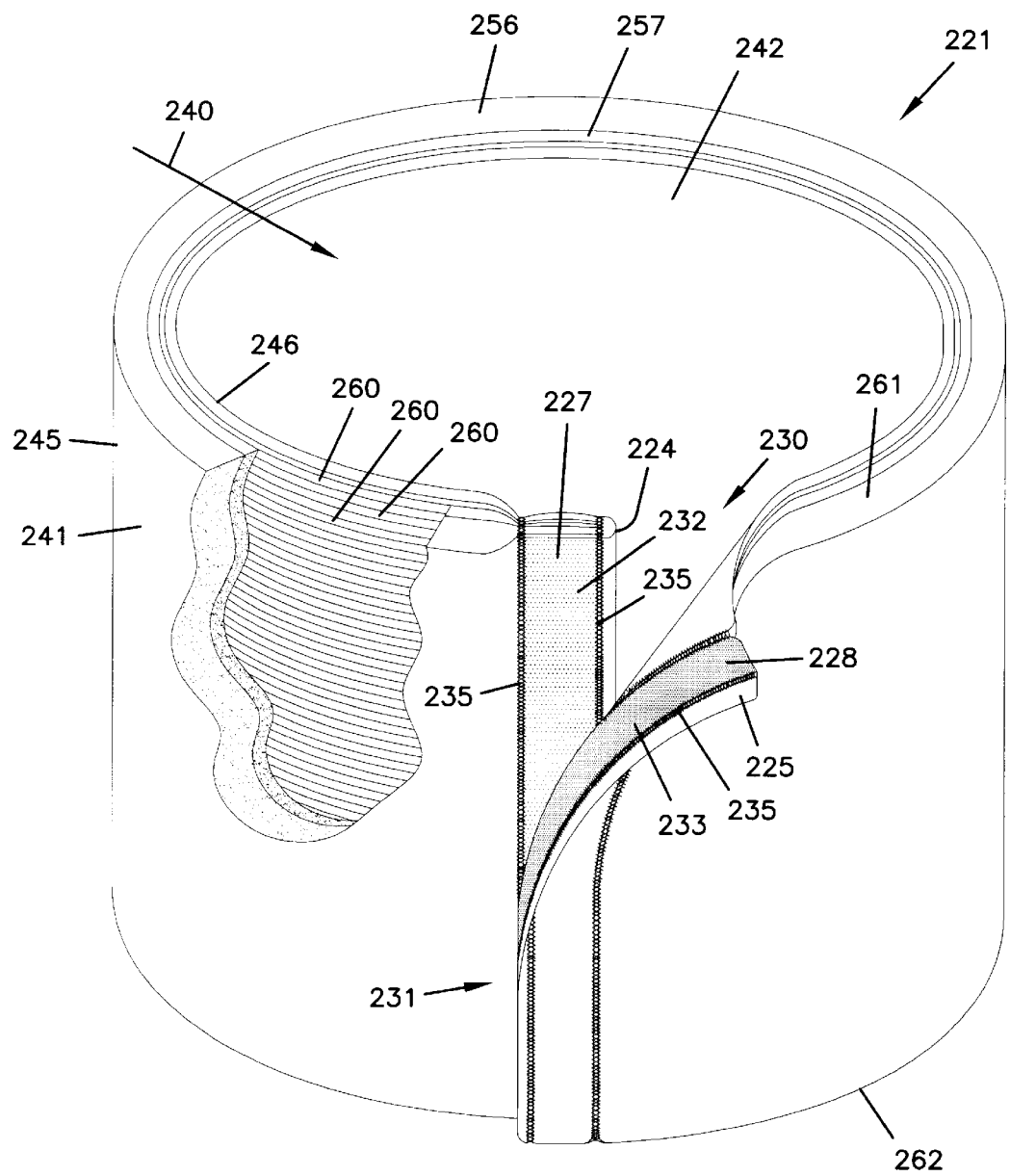
FIG. 8 is a schematic, perspective view of a pre-filter wrap according to the present invention.
Figure 9:
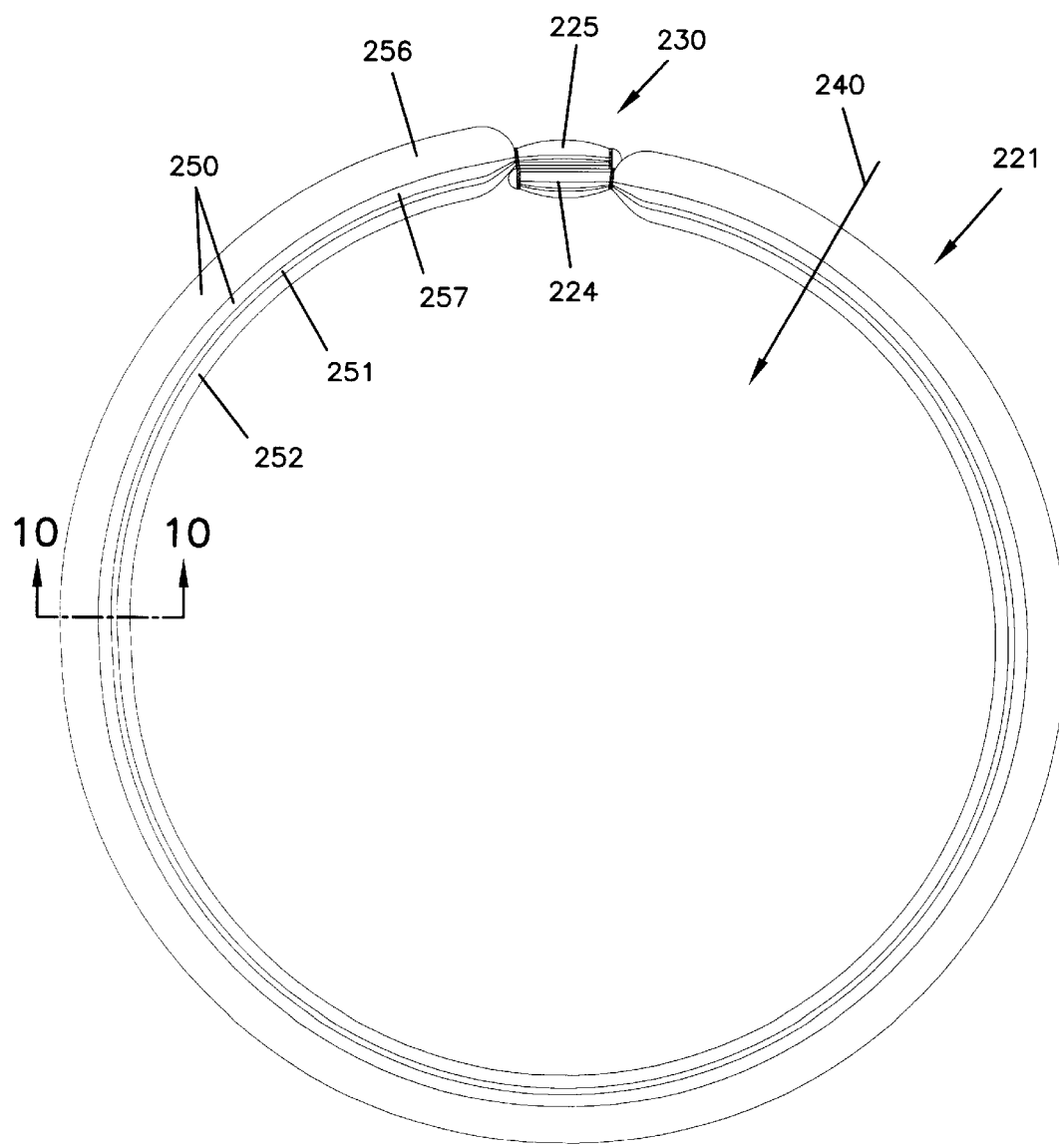
FIG. 9 is a top plan view of the wrap of FIG. 8.
Figure 10:
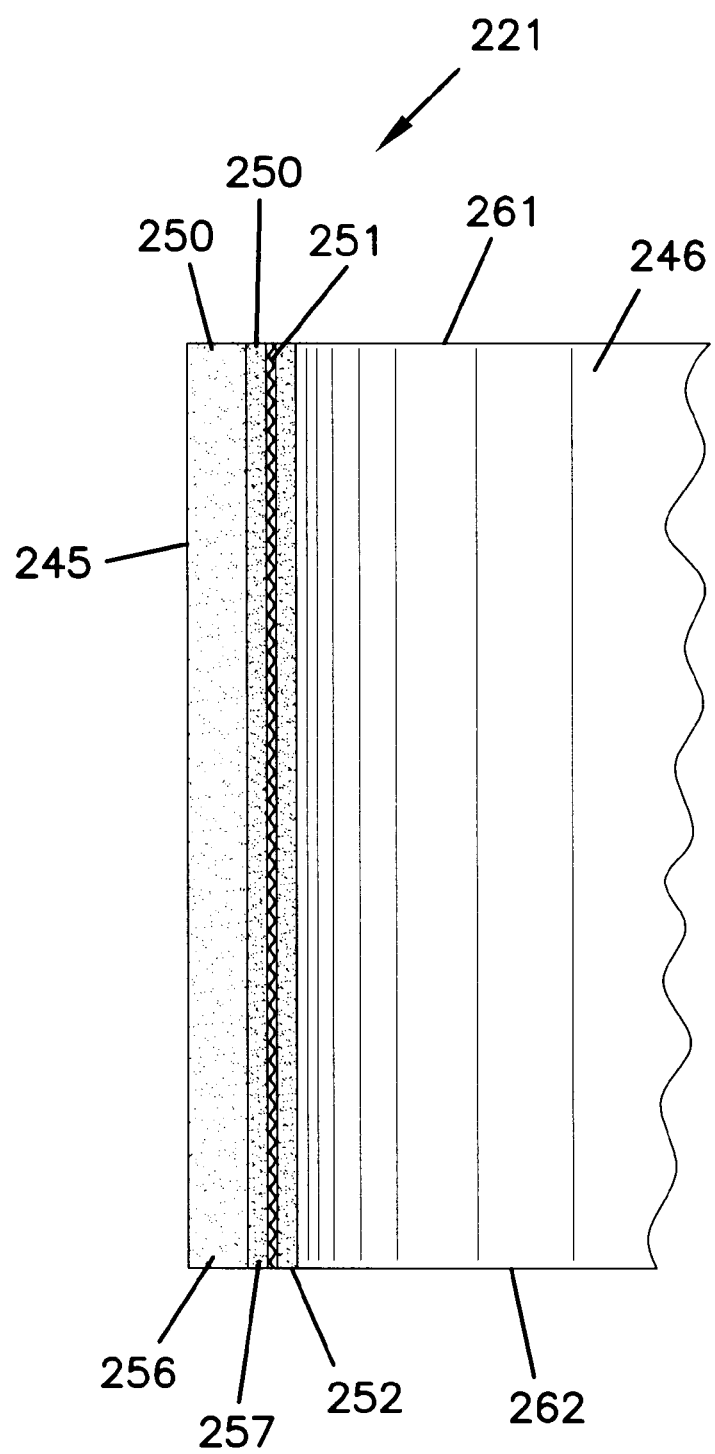
FIG. 10 is a fragmentary cross-sectional view taken generally along line 10—10, FIG. 9.

Attention is now directed to FIGS. 8, 9 and 10.

In FIGS. 8, 9 and 10 there is depicted a pre-filter wrap 221 according to the present invention. This pre-filter wrap 221 would, advantageously, be useable as a pre-filter wrap in place of pre-filter wrap 112 in cartridge system 12', FIG. 6; or in place of pre-filter wrap 91 in collector cartridge system 12, FIG. 4. The preferred internal cartridge around which wrap 221 can be used, will be of the type-described generally above with respect to FIGS. 1–7. From the description of materials hereinbelow, it will be apparent that the pre-filter wrap 221 can be configured in a variety of shapes and sizes, to fit around the outside of a variety of internal cartridges.

The pre-filter wrap 221 is depicted in FIG. 8 and is shown in a configuration which it would possess during a step of mounting around a remainder of a circular, cylindrical, cartridge, (not shown). The pre-filter wrap 221 is shown in FIG. 8, therefore, in a circular configuration. The pre-filter wrap 221 depicted is rectangular (when unfolded) and includes first and second ends 224 and 225. When mounted around a remainder of the cartridge, the ends 224 and 225 would typically be overlapped, as partially shown in FIG. 8. In the regions 227 and 228 of overlap, the pre-filter wrap 221 is provided with an engagement mechanism 230. The preferred engagement mechanism 230 is a hook and loop closure mechanism 231 such as that available under the trade designation VELCRO®. The hook and loop closure mechanism 231 comprises two strips of hook and loop closure material 232, 233, one each of which is secured by stitching 235 in regions 227 and 228 respectively. As will be described below, the pre-filter wrap 221 comprises a plurality of layers of material and stitching in regions 235 preferably extends through all media layers, securing them together in these regions.

In general, the arrangement of FIG. 8 is a "forward flow" pre-filter wrap. That is, pre-filter wrap 221 is shown as it would be constructed and arranged to wrap around the cartridge used for "forward flow" collection of mist aerosol, i.e. with a flow of air, carrying the mist therein, through the pre-filter in the direction shown by arrows 240, FIGS. 8 and 9. This is a flow in the direction from an exterior 241, to an interior region 242 through wrap 221. Of course in typical use, the remainder of filter cartridge would be positioned with an interior region 241, as depicted in FIGS. 4 and 6 and the flow would also be in a "forward" direction through the cartridge.

Alternately stated, air flow is generally directed from an upstream side to a downstream side of the filter wraps, and for the "forward" flow arrangement depicted in FIGS. 8 and 9, the upstream side is indicated generally at 245 and the downstream side generally at 246. Analogous systems to those described herein (of course reversed with respect to physical direction of layer gradient) could be constructed for reverse flow (inside to outside) systems.

Preferred pre-filter wraps, such as pre-filter wrap 221, according to the present invention generally include three stages of filter media therein. These stages will be generally characterized herein as Stage I, Stage II and Stage III. For pre-filter wrap 221: Stage I is generally indicated at reference no. 250, FIG. 9; Stage II at reference no. 251; and, Stage III at reference no. 252. In general, Stage I is the most upstream stage, Stage II an intermediate stage, and Stage III is a most downstream stage of the filter media. For the particular preferred arrangement shown, Stage I, reference no. 250, comprises a stage having two regions and types of media, indicated at 256 and 257, therein. It should be understood that any of Stages I, II and III could comprise more than one layer of material. In some instances, the more than one layer could be of the same material, and in other preferred systems layers in a Stage could comprise layers of different materials. The preferred arrangement, depicted in FIG. 8–10, is one wherein: Stage I is a multilayered region provided with a preferred gradient, as characterized hereinbelow; Stage II is an intermediate region of one layer of preferred material; and Stage III is a downstream region comprising one layer of material. Preferred characteristics and materials for the various stages, are as follows.

Stage I

Stage I is the first portion of the pre-filter encountered by gas flow, carrying mist to be collected therein, during filtering. As a result, it is sometimes characterized as the most upstream region. Stage I is preferably a relatively "high loft" media, so that it can load significantly with material in a pre-filtering process, without undesirable levels of plugging or occlusion. Preferably it is formed from a fibrous depth media of the type appropriate for collection of the selected liquid thereon. Preferably the media in Stage I is a polyester media.

The preferred construction for Stage I, is a construction with a gradient through its depth. Preferably, to accomplish this, Stage I comprises more than one layer of media, oriented in series with respect to air passage through the pre-filter wrap 221. Preferably the gradient is provided such that the outer most layer 256 (most upstream layer in use) is generally formed from a material which, when tested alone, has a lower efficiency for filtering (or higher permeability) than does the media the next downstream region 257 (when tested alone).

The gradient can be provided in a variety of manners including, for example, by providing for materials that have: a variation in thickness from one another, a variation in percent solidity from one another; and/or, a variation in average fiber size from one another. Typical, preferred, gradients will result from providing for variation in all three of these variables, with the outer layer having (relative to the next inner layer): higher permeability; lower percent solidity; higher average fiber diameter; and, greater thickness.

Preferred materials for the outermost layer 256 of the media in Stage I comprise nonwoven, high loft polyester fiber media having: a permeability (minimum) of 500 fpm (152 mpm) and typically about 500 to 750 fpm; a % solidity, free state of less than 1.2%, typically less than 1% and preferably about 0.5 to 0.8%; a basis weight of about 4.0–4.8 oz. per yard$^2$ (136–163 gram per meter$^2$); a free state thickness (thickness at 0.002 psi compression) of 0.55–0.70 inches (14.0–18 mm); and an average fiber size of at least 14 microns and not more than 27 microns (either mass or length average), preferably about 16–24 microns (average or length average.) (Of course mass and weight average are the same if the material is not of a mixture of different sized fibers.) Useable materials are readily available from such suppliers as Fiberbond Corp. of Michigan City, Ind. and Kem-Wove, Inc. of Charlotte, N.C. The material may comprise a mixture of fibers. Typical commercial products will be provided with a resin thereon in order to ensure integrity of the fiber structure. Bicomponent fiber systems could be used to provide a similar effect.

The media in region 257 is preferably one that provides for a gradient in efficiency, or % solidity, with an increase in efficiency relative to region 256. Preferably the material is a non-woven polyester fiber filter medium having a permeability, minimum, of at least 350 fpm, typically at least 370 fpm (113 m/min.) but generally at least 50 ft/min. lower (usually at least 100 fpm lower) than the media in region 256. (Typically the permeability is about 350 to 550 fpm.) Preferably the material is one which has a free state thickness (i.e. thickness at 0.002 psi compression) within the range of 0.32–0.42 inches (8.1–10.7 mm); and a basis weight of 3.1–3.8 oz per yard$^2$ (105–129 gram per meter$^2$). Preferably the material is one having an average fiber diameter of at least 8 microns and not more than 16 microns (weight or length average), more preferably at least 10 microns and typically 10–14 microns. Preferably the material is one having a free state solidity of less than 1.2%, typically 0.5–1.0% usually about 0.7–0.9%. Materials comprising a mixture of fibers can be used.

Such materials are commercially available from such suppliers as Fiberbond Corp. of Michigan City, Ind. and Kem-Wove, Inc. of Charlotte, N.C. Commercial samples will typically be provided with a resin therein in order to maintain structural integrity. Bicomponent fibers may be used for a similar effect.

Stage II

Stage II is an intermediate stage which facilitates coalescence and drainage. The media in Stage II preferably: has a substantially lower permeability than Stage I, has an average pore size sufficiently small to ensure coalescence therein of trapped liquid; and, is a material which has sufficient permeability and related characteristics such that it does not too rapidly occlude and is such that a steady state operation can be achieved during normal operation of the mist collector (i.e. with a face velocity of 80 to 140 fpm and a $\Delta P$ of about 4" $H_2O$ or less. A preferred material would be one having: a basis weight of at least 65 lbs/3,000 ft$^2$ typically 70–82 lbs/3,000 ft$^2$ most preferably 74–78 lbs/3,000 ft$^2$. Preferably the material is one having a Frazier permeability lower than the material in any portion of Stage I, preferably at least 30 fpm lower. Preferably the material as a permeability (minimum) of 180 fpm, preferably no more than 350 fpm and is most preferably within the range of 200–320 fpm (79±18 meter/ minute). The material is preferably one having a thickness of no greater than about 0.04 inches, typically about 0.02 to 0.04 inches and preferably about 0.025 inches. The material is preferably one having an average fiber size within the range of 16–24 microns. In general, preferred materials will have an average pore size of at least 150 microns, typically at least 200 microns, preferably not more than about 370 microns and in typical preferred applications within the range of 200–320 microns.

Materials having a dry burst strength of about 125 psi (861 kPa) and a wet burst strength of about 60–160 psi (758±345 kPa) will be preferred. Materials comprising a mixture of fibers can be used.

Most preferably the material is at least 80% by wt. fiber, most preferably about 90% or more, the remainder being resin.

In some applications, a flat (non-corrugated and non-pleated) material will be used as Stage II. In other applications, the constructions will be ones in which structural integrity and a higher percentage surface area within the wrap, are provided as a result of orienting the arrangement to have pleats or corrugations (the terms "pleats" and "corrugations" both being used to refer to materials that, in cross-section, have alternating peaks and valleys). A corrugation depth of no more than 0.03 inch, typically at least 0.01 inch, usually 0.013±0.003 inches (0.33±0.08 mm) is useable, for example. While the pleats or corrugations can be run in either of the circumferential direction or axial direction, the preferred construction (if corrugated at all) as shown in FIG. 8 is one in which the corrugations 260 run circumferentially, i.e. around the arrangement rather than vertically (i.e in an axial direction). This can be readily achieved with a preferred material as described having a corrugated structure as described.

Appropriate materials can be obtained from a variety of media suppliers including, for example, Hollingsworth & Vose, East Walpole, Mass. Typical commercial materials will be provided having a resin content (for example up to about 40%, by wt.) therein in order to ensure structural integrity. Bicomponent fibers can be used.

Stage III

The preferred material for the most downstream stage, Stage III, is preferably a material such as the preferred material described for region 257 in Stage I. Similar materials from the same commercial sources can be used. A reasons such a material is preferred, is that it provides for a good region downstream from Stage II, to which liquid material collected in Stage II can drain, yet at the same time the region is of a sufficiently low velocity and high load capability, that the steady state operation preferred can be relatively rapidly achieved and will be long lasting. That is, the liquid collected in such a material will generally drain at a rate such as to provide for steady state operation without surpassing the preferred ΔP, for example 4 inches of $H_2O$.

It has been found that when the pre-filter wrap 221 is as described in this section as preferred, having Stages I, II and III therein, the pre-filter wrap is particularly good for use with 100% oil collection systems. However, it is noted that such wraps will also be effective even when the liquid to be collected is not 100% oil, for example when it is an aqueous based (80–90% water) cutting fluid.

It is noted that for the preferred arrangements depicted in FIGS. 8–10, the various layers of media in Stages I, II and III are only sewn (stitched) to one another in the region of ends 224–225, and the layers are specifically not sewn to one another along the top and bottom edges 261 and 262 respectively. This helps allow for passage of the coalesced liquid through the various layers with drainage down toward the bottom, in use. Also, as a result of not being sewn along either edge 261 or 262, the wrap 221 is vertically reversible.

E. Operation

Although alternate applications are possible, preferred mist collector systems utilizing principles according to the present invention are constructed and arranged for preferred operation with the following parameters:

1. A face velocity during collection on the order of at least 80 fpm, typically less than 140 fpm, preferably 100 to 120 fpm, face velocity being the volume flow of air divided by surface area of the outside of the pre-filter wrap.
2. A steady state operation achieved within a period of 1 to 7 days of continuous operation and lasting, without increase substantially above about a 4 inch ΔP, for a period of at least 6 weeks, preferably at least 4 months (120 days) and more preferably at least 5–6 months (150–180 days).
3. A capability of collecting and draining, during operation, a volume of liquid on the order of at least 50 $mg/m^3$ (of air passing through the filter), typically at least 75 $mg/m^3$ and in some instances 175 $mg/m^3$ or higher (for example 200–300 $mg/m^3$. (Of course the same materials may be used in operations involving lower load rates.)

With respect to operation, the following principles and observations will be of interest. In general, products characterized as above can be used in either 100% oil applications or with water soluble cutting fluids. The system is very flexible, and was particularly designed to be capable of addressing very vigorous applications; for example, 100% oil applications involving chip blasters directing pressurized oil onto the workpiece, at pressures on the order of 300 psi or greater, for example, 300 psi–1,000 psi, (in order to flush and remove metal shavings from the cutting activity). The systems as characterized above will, in general, be useable and operable in many instances regardless of the type of metal involved (steel, brass, iron, aluminum, stainless steel, etc.) the relative temperature of the system, and the nature of the cutting fluid and its method of application. The pre-wrap will also extend the useful life of the downstream cartridge and/or HEPA filters.

It is noted that when the cutting fluid involves an oil water mix, an effect to be taken into consideration with respect to filter design relates to the fact that the water will to some extent evaporate. This not only reduces average particle size but, in some instances, can leave the airborne mist as a substantially higher percent, by weight, of oil than was present in the original cutting fluid. That is, during the operation, the water will tend to evaporate whereas the oil will not, changing the relative percent, by weight, of each present in the airborne mist. Indeed in some instances of heavy cutting fluid applications and relatively high temperatures, the resulting airborne mist from an industrial process using a cutting fluid containing 8–15% oil, will simulate an airborne mist of nearly 100% oil.

The above characterized filter system will in general be preferred to such alternative arrangements as electrostatic precipitators or centrifugal separators, due primarily to cost, ease of installation and operation, and based on cost/efficiency concerns. It is noted that, however, the principles can be applied in some instances in combination with other filtering approaches. In general, while media according to the present invention can be provided with (initially) electrostatic charge, such is not necessary for good, initial efficiency or overall preferred efficient operation. Thus, neutral media is useable.

We claim:

1. A pre-filter for a mist collection filter; said pre-filter comprising:
   (a) an upstream region of non-woven fibrous depth media;
   (b) an intermediate region of fibrous media having:
      (i) an average pore size of no greater than 370 microns;
      (ii) a permeability within the range of 180–350 ft/min.; and,
      (iii) a thickness of no greater than 0.04 inches; and,
   (c) a downstream region of non-woven fibrous depth media.
2. A pre-filter according to claim 1 wherein:
   (a) said intermediate region comprises a material having a basis wt. within the range of 70–82 $lbs/3000 ft^2$.
3. A pre-filter according to claim 2 wherein:
   (a) said intermediate region is corrugated.
4. A pre-filter according to claim 3 wherein:
   (a) said intermediate region comprises a corrugation depth of at least 0.01 inch.
5. A pre-filter according to claim 1 wherein:
   (a) said upstream region comprises first and second layers of non-woven fibrous depth media;

(i) a more upstream one of said first and second layers comprising a material having a lower efficiency of filtering than a more downstream one of said first and second layers.

6. A pre-filter according to claim 1 wherein:
(a) said upstream region comprises first and second layers of non-woven fibrous depth media;
  (i) said first layer being more upstream than said second layer and comprising a material having a permeability of at least 500 ft/min.; and,
  (ii) said second layer being more downstream than said first layer and comprising a material a permeability of at least 350 ft/min., and at least 50 ft/min. lower than the permeability of the material from which the first layer is formed.

7. A pre-filter according to claim 6 wherein:
(a) said first layer comprises material having a permeability within the range of 500 to 750 fpm; and
(b) said second layer comprises material having a permeability within the range of 350 to 550 fpm.

8. A pre-filter according to claim 7 wherein:
(a) said first layer comprises material having an average fiber diameter (weight average) within the range of 14 to 27 microns; and,
(b) said second layer comprises material having an average fiber diameter which is lower than an average fiber diameter of the material within the first layer.

9. A pre-filter according to claim 8 wherein:
(a) said second layer has an average fiber diameter within the range of 10 to 14 microns.

10. A pre-filter according to claim 9 wherein:
(a) said downstream region of non-woven fibrous depth media comprises a material having:
  (i) a permeability of less than the permeability of the first layer and within the range of 350 to 550 fpm; and,
  (ii) an average fiber diameter which is lower than the average fiber diameter of the material within the first layer and which is within the range of 10 to 14 microns.

11. A method of filtering air carrying airborne liquid oil contaminant; said method including a step of:
(a) directing the air through a multi-stage pre-filter wrap under conditions of:
  (i) a face velocity within the range of 80 to 140 ft/min.;
  (ii) a liquid load rate of at least 75 mg/m$^3$; and,
  (iii) continued operation for a period of at least 120 days without a pressure differential across the filter substantially exceeding 4 inches of $H_2O$.

12. A method according to claim 11 wherein:
(a) said step of directing comprises directing the air through a three stage pre-filter having:
  (i) an upstream region of non-woven fibrous depth media;
  (ii) an intermediate region of fibrous media having:
    (A) an average pore size of no greater than 370 microns;
    (B) a permeability within the range of 200–320 ft/min.; and,
    (C) a thickness of no greater than 0.04 inches; and,
  (iii) a downstream region of non-woven fibrous depth media.

13. A method according to claim 12 wherein:
(a) said step of directing comprises directing the air through a pre-filter wherein:
  (i) said upstream region comprises first and second layers of non-woven fibrous depth media;
    (A) said first layer being more upstream than said second layer and comprising a material having a permeability of at least 500 ft/min.; and,
    (B) said second layer being more downstream than said first layer and comprising a material a permeability of at least 350 ft/min. and at least 50 ft/min. lower than the permeability of the material from which the first layer is formed.

* * * * *